(12) United States Patent
Cheong (10) Patent No.: US 8,908,322 B1
(45) Date of Patent: Dec. 9, 2014

(54) SPINDLE MOTOR HAVING BASE MEMBER WITH FITTING PROTRUSIONS AND HARD DISK DRIVE INCLUDING THE SAME

(71) Applicant: Samsung Electro-Mechanics Co., Ltd., Suwon (KR)

(72) Inventor: Shin Young Cheong, Suwon (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 0 days.

(21) Appl. No.: 13/974,472

(22) Filed: Aug. 23, 2013

(30) Foreign Application Priority Data

Jun. 12, 2013 (KR) ........................ 10-2013-0067152

(51) Int. Cl.
*G11B 17/02* (2006.01)
*H02K 7/08* (2006.01)
*F16C 32/06* (2006.01)
*G11B 19/20* (2006.01)
*H02K 5/167* (2006.01)

(52) U.S. Cl.
CPC .......... *G11B 19/2036* (2013.01); *H02K 5/1675* (2013.01)
USPC ......................................... 360/99.08; 310/90

(58) Field of Classification Search
None
See application file for complete search history.

(56) References Cited

U.S. PATENT DOCUMENTS

| 6,097,121 | A  | * | 8/2000  | Oku ................................ 310/91 |
| 6,922,309 | B2 | * | 7/2005  | Kayama et al. ............ 360/99.08 |
| 7,520,674 | B2 | * | 4/2009  | Nakamiya et al. ............ 384/100 |
| 8,552,606 | B1 | * | 10/2013 | Cheong et al. .................. 310/90 |
| 8,729,757 | B2 | * | 5/2014  | Cheong et al. .................. 310/90 |
| 2011/0187241 | A1 |   | 8/2011  | Yoo et al. |
| 2013/0049553 | A1 |   | 2/2013  | Min et al. |

FOREIGN PATENT DOCUMENTS

KR    10-2011-0090748    8/2011
KR    10-2013-0021206    3/2013

* cited by examiner

*Primary Examiner* — Brian Miller (57) ABSTRACT

There are provided a spindle motor and a hard disk drive including the same. The spindle motor includes: a shaft; a sleeve rotatably supporting the shaft by fluid dynamic pressure; a stator core installed on an outer surface of the sleeve; a base member fixed to the sleeve, wherein at least a portion of an inner edge of the base member in a radial direction is inserted into a fixing portion formed in a circumferential direction in an outer surface of the sleeve in the radial direction, and the sleeve includes a first sleeve supporting the shaft and a second sleeve provided outwardly of the sleeve and having the stator core installed on an outer surface thereof.

15 Claims, 9 Drawing Sheets

SPINDLE MOTOR HAVING BASE MEMBER WITH FITTING PROTRUSIONS AND HARD DISK DRIVE INCLUDING THE SAME

CROSS-REFERENCE TO RELATED APPLICATIONS

This application claims the priority of Korean Patent Application No. 10-2013-0067152 filed on Jun. 12, 2013, in the Korean Intellectual Property Office, the disclosure of which is incorporated herein by reference.

BACKGROUND OF THE INVENTION

1. Field of the Invention

The present invention relates to a spindle motor and a hard disk drive including the same.

2. Description of the Related Art

A hard disk drive (HDD), an information storage device, reads data stored on a disk or writes data to a disk using a read/write head.

A hard disk drive requires a disk driving device capable of driving the disk. In such a disk driving device, a small-sized spindle motor is commonly used.

Such a small-sized spindle motor frequently uses a hydrodynamic bearing assembly. A shaft, a rotating member of the hydrodynamic bearing assembly, and a sleeve, a fixed member thereof, have a lubricating fluid interposed therebetween, such that the shaft is supported by fluid pressure generated in the lubricating fluid.

In addition, an upper portion of the shaft is mounted with a rotor hub rotating together with the shaft and having a recording disk mounted thereon, wherein the rotor hub is fixedly coupled to the upper portion of the shaft and has a disk shape in which it is extended in a radial direction, based on the shaft. Therefore, the lubricating fluid may also be interposed between an upper surface of the sleeve and the rotor hub.

According to the related art, in manufacturing a base provided in the hard disk drive, a post-processing scheme of die-casting aluminum (Al) and then removing flash, or the like, generated due to the die-casting has been used.

However, in the die-casting scheme according to the related art, since a process of injecting aluminum (Al) in a molten state to make a form is performed, high degrees of temperature and pressure are required, such that a large amount of energy is required in the process and a process time and manufacturing costs increase.

Therefore, in order to solve the problems of the die-casting process, an attempt to manufacture the base by performing plastic working such as press working, or the like, on a steel sheet has been conducted. However, in the case of manufacturing the base by press working, since the base basically has a unique thickness, a problem may be generated in coupling a core to the base.

That is, in the case in which the base is manufactured in the die-casting process, the base may be provided with a step so as to allow the core to be seated thereon. However, in the case in which the base is manufactured by pressing a plate having a unique thickness, since the base has the unique thickness, it may be difficult to form a core seating part on the base.

In addition, for the same reason, in the case in which the base is manufactured by die-casting, the base may be provided with a step to seat the sleeve thereon. However, in the case in which the base is manufactured by pressing a plate having a uniform thickness, it may be difficult to couple the base and the sleeve to each other.

SUMMARY OF THE INVENTION

An aspect of the present invention provides a spindle motor in which a core may be stably and easily seated on a base manufactured by plastic working such as press working, or the like.

An aspect of the present invention also provides a spindle motor in which a base manufactured by plastic working such as pressing working, or the like, and a sleeve may be easily coupled to each other.

According to an aspect of the present invention, there is provided a spindle motor including: a shaft; a sleeve rotatably supporting the shaft by fluid dynamic pressure; a stator core installed on an outer surface of the sleeve; a base member fixed to the sleeve, wherein at least a portion of an inner edge of the base member in a radial direction is inserted into a fixing groove formed in a circumferential direction in an outer surface of the sleeve in the radial direction, and the sleeve includes a first sleeve supporting the shaft and a second sleeve provided outwardly of the sleeve and having the stator core installed on an outer surface thereof.

The base member may be provided with at least two fitting protrusions protruding in an inner diameter direction and formed in the circumferential direction, a lower end portion of the sleeve in an axial direction may be provided with support pieces protruding in an outer diameter direction so as to form the fixing groove, and the fitting protrusions may be inserted into the fixing groove through at least two fitting grooves formed in the circumferential direction so as to be in communication with the fixing groove in the axial direction and then rotated in the circumferential direction to thereby be fixed so as to be overlapped with the support pieces in the axial direction.

The fitting protrusion may have an inner diameter smaller than an outer diameter of the support piece.

At least two fixing grooves may be provided so as to be spaced apart from each other by a predetermined interval in the circumferential direction, the fitting groove may be provided on one side of the fixing groove in the circumferential direction, and the fitting protrusion may be inserted into the fixing groove through the fitting groove and then rotated toward a side opposite to one side of the fixing groove in the circumferential direction to thereby be fixed so as to be overlapped with the support piece in an axial direction.

A lower end portion of the sleeve in an axial direction may be provided with a support piece protruding in an outer diameter direction so as to be continuous in the circumferential direction in order to form the fixing groove, an inner edge of the base member in the radial direction may have a diameter smaller than that of the support piece, and the base member may be inserted into the fixing groove.

The fixing groove may have an adhesive applied thereto, and the sleeve and the base member may be bonded to each other by the adhesive.

The sleeve and the base member may be welded to each other.

The base member may be manufactured by performing plastic working on a steel sheet.

The first and second sleeves may be formed as separate members.

The base member may be fixed to the second sleeve.

The second sleeve may be provided with a core seating part protruding outwardly and the stator core may be seated on the core seating part.

An upper or lower surface of the stator core may be bonded to the core seating part with an adhesive.

The first and second sleeves may be formed integrally with each other.

The sleeve may have a cover member coupled thereto at a lower end portion thereof in an axial direction, the cover member closing a shaft hole of the sleeve to preventing leakage of a lubricating fluid, and a lower surface of the base member may be positioned in a position lower than those of lower surfaces of the sleeve and the cover member.

According to another aspect of the present invention, there is provided a hard disk drive including: the spindle motor as described above rotating a disk by power applied thereto through a substrate; a magnetic head writing data to and reproducing the data from the disk; and a head transfer part moving the magnetic head to a predetermined position above the disk.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Hereinafter, embodiments of the present invention will be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art. In the drawings, the shapes and dimensions of elements may be exaggerated for clarity, and the same reference numerals will be used throughout to designate the same or like elements.

Figure 1:
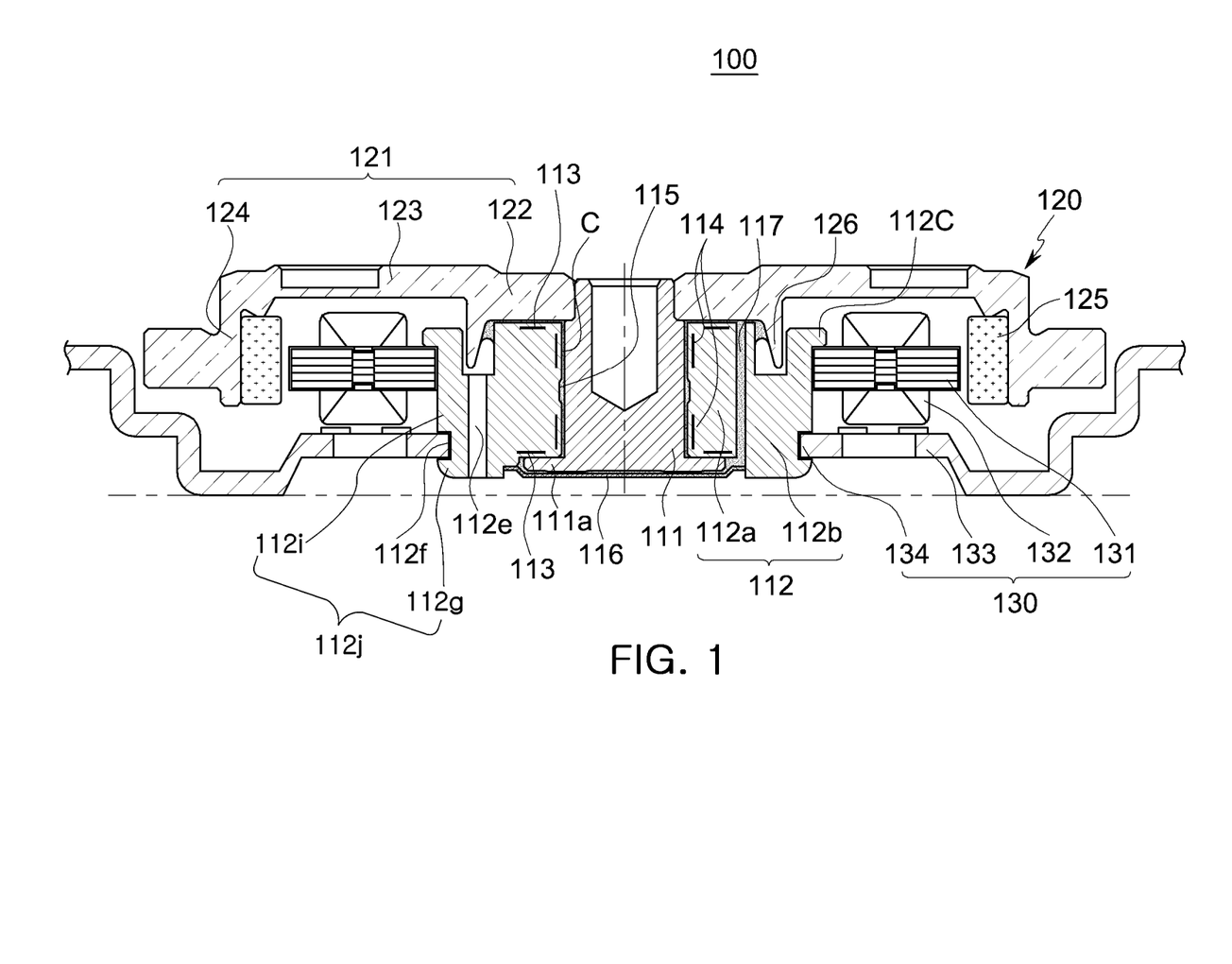
FIG. 1 is a schematic cross-sectional view showing a spindle motor according to an embodiment of the present invention.

FIG. 1 is a schematic cross-sectional view showing a spindle motor according to an embodiment of the present invention.

Referring to FIG. 1, the spindle motor 100 according to the embodiment of the present invention may include a hydrodynamic bearing assembly 110 including a shaft 111, a first sleeve 112a, a rotor hub 121, a stopper 111a, and a cover member 116, a rotor 120 including the rotor hub 121, and a stator 130 including a core 131 having a coil 132 wound therearound.

The hydrodynamic bearing assembly 110 may include the rotor hub 121, wherein the rotor hub 121 may be a component configuring the hydrodynamic bearing assembly 110 simultaneously with configuring a rotor 120 to be described below.

In addition, a rotating member assembly may include the shaft 111 and the rotor hub 121 mounted on the shaft 111.

In addition, a sleeve 112 may include the first sleeve 112a and a second sleeve 112b to be described below.

Terms with respect to directions will be first defined. As viewed in FIG. 1, an axial direction refers to a vertical direction based on the shaft 111, and an outer diameter or inner diameter direction refers to a direction toward an outer edge of the rotor hub 121 based on the shaft 111 or a direction toward the center of the shaft 111 based on the outer edge of the rotor hub 121.

Further, in the following description, a rotating member may be a rotating member such as the shaft 111, the rotor 120 including the rotor hub 121, a magnet 125 mounted on the rotor 120, and the like, and a fixed member, a member other than the rotating member, may be a member fixed to the rotating member, such as the first sleeve 112a, the second sleeve 112b, the stator 130, a base member 133, and the like.

In addition, a communications path between an interface of a lubricating fluid and the outside means a path through which the interface of the lubricating fluid is connected to the outside of the spindle motor and may allow air to be introduced and discharged therethrough.

The first sleeve 112a may support the shaft 111 so that an upper end of the shaft 111 protrudes in an upward axial direction. The first sleeve 112a may be formed by forging Cu or Al or sintering a Cu—Fe-based alloy powder or a SUS-based powder. However, the sleeve 112 is not limited to being manufactured by the above-mentioned method, but may be manufactured by various methods.

Here, the shaft 111 may be inserted into a shaft hole of the first sleeve 112a so as to have a micro clearance therewith, thereby forming a bearing clearance C. The bearing clearance C may be filled with the lubricating fluid (hereinafter, both 'lubricating fluid' and 'oil' will be used). At least one of an outer diameter of the shaft 111 and an inner diameter of the first sleeve 112a may be provided with upper and lower radial dynamic grooves 114. At the time of rotation of the rotor 120, a radial bearing may be generated by the radial dynamic groove 114, and the rotor may smoothly rotate due to the radial bearing.

The spindle motor 100 according to the embodiment of the present invention may use a fluid bearing and generally include a pair of upper and lower radial dynamic grooves for rotational stability to allow two hydrodynamic bearings to be formed at the time of rotation of the spindle motor.

However, the radial dynamic grooves 114 are not limited to being formed in an inner surface of the first sleeve 112a as described above, but may also be formed in an outer diameter portion of the shaft 111. In addition, the number of radial dynamic grooves 114 is not limited.

Here, the radial dynamic groove 114 may have any one of a herringbone pattern, a spiral pattern, and a screw pattern. However, the radial dynamic groove 114 may have any pattern as long as radial dynamic pressure may be generated thereby.

The first sleeve 112a may be provided with a circulation hole 117 allowing upper and lower portions thereof to be in communication with each other. The circulation hole 117 may disperse pressure in the lubricating fluid in the hydrodynamic bearing assembly 110 to maintain balance in the pressure of the lubricating fluid and may move air bubbles, or the like, present in the hydrodynamic bearing assembly 110 so as to be discharged by circulation.

Here, the shaft 111 may include the stopper 111a provided at a lower end portion thereof and protruding in the outer diameter direction, wherein the stopper 111a may be caught by a lower end surface of the first sleeve 112a to limit floating of the shaft 111 and the rotor 120.

Meanwhile, a groove shaped reservoir part 115 may be formed in at least one of the first sleeve 112a and the shaft 111 between the upper and lower radial dynamic grooves 114 so that the bearing clearance between the first sleeve 112a and the shaft 111 is wider than other portions. Although the case in which the reservoir part 115 is formed in an inner peripheral surface of the first sleeve 112a in a circumferential direction has been shown in FIG. 1, the present invention is not limited thereto. The reservoir part 115 may be provided in an outer peripheral surface of the shaft 111 in the circumferential direction.

In addition, the first sleeve 112a may include a thrust dynamic groove 113 formed in at least one of an upper surface and a lower surface thereof to generate thrust dynamic pressure at the time of the rotation of the shaft. The thrust dynamic groove 113 is not limited to being formed in the first sleeve 112a, but may be formed in the rotor hub 121 facing to an upper surface of the first sleeve 112a or an upper surface of the stopper 111a facing a lower surface of the first sleeve 112a. The thrust dynamic groove 113 may have various patterns, such as a spiral pattern, a herringbone pattern, a screw pattern, and the like.

Meanwhile, the first sleeve 112a may have the cover member 116 coupled thereto at a lower portion thereof in the axial direction, wherein the cover member 116 closes the shaft hole of the first sleeve 112a to preventing leakage of the lubricating fluid.

Here, the cover member 116 may receive the lubricating fluid in a clearance formed between a lower surface of the shaft 111 and the cover member 116 to serve as the bearing supporting the lower surface of the shaft 111 at the time of the rotation of the shaft 111.

In addition, a lower surface of a base member 133 to be described in detail below may be positioned in a position lower than those of lower surfaces of the sleeve 112: 112a and 112b and the cover member 116.

The second sleeve 112b may be provided outwardly of the first sleeve 112a. The first sleeve 112a positioned at the inner side may serve to support the shaft 111 and form the hydrodynamic bearing assembly, and the second sleeve 112b positioned at the outer side may serve to fix a stator core 131 to be described below.

A main wall part 126 extended from a rotor hub 121 to be described below in a downward axial direction may have an inner surface at least partially facing the outer surface of the first sleeve 112a and an outer surface at least partially facing an inner surface of the second sleeve 112b. That is, the main wall part 126 may be disposed between the first and second sleeves 112a and 112b. In this case, the outer surface of the main wall part 126 and the inner surface of the sleeve 112b may form a labyrinth seal. Therefore, scattering or leakage of the oil may be significantly decreased.

Here, the first and second sleeves 112a and 112b may have a space formed therebetween so that the main wall part 126 is disposed therebetween.

Meanwhile, the first and second sleeves 112a and 112b may be formed separately from or integrally with each other. When the number of components is decreased, since a product may be manufactured using a single cutting process without coupling between the components, a coupling tolerance according to the coupling between the components is not generated, whereby a coupling degree of the product may be increased. Further, the first and second sleeves 112a and 112b may be made of the same material.

In addition, the first and second sleeves 112a and 112b may include at least one oil injecting hole 112e penetrating therebetween in the axial direction. More specifically, at least one of the first and second sleeves 112a and 112b may be provided with at least one oil injecting hole 112e penetrating therethrough in the axial direction.

Here, the axial direction may include the same direction as the axial direction or a slightly inclined direction. The oil injecting hole 112e is provided to complete the hydrodynamic bearing assembly 100 and allow the oil to be easily injected into a bearing clearance C. The oil may also be injected by other methods without using the oil injecting hole 112e.

Further, an upper end of the second sleeve 112b may be provided with a core seating part 112c protruding outwardly to allow the core 131 to be caught by an upper portion thereof, thereby guiding a fixed position of the core. The core 131 may be bonded to the core seating part 112c with an adhesive.

In this case, parallelism between a surface of the core seating part 112c on which the core 131 is seated and the upper surface of the first sleeve 112a in which the thrust dynamic pressure bearing is formed may be 50 μm or less, and a perpendicularity between the surface of the core seating part 112c on which the core 131 is seated and the inner surface of the first sleeve 112a in which the radial dynamic pressure bearing is formed may be 50 μm or less. That is, error ranges of the parallelism and the perpendicularity may be 50 μm or less. In the case in which the first and second sleeves 112a and 112b are formed integrally with each other, it may be preferable to process the first and second sleeves 112a and 112b simultaneously to decrease the error range.

In addition, at least a portion of an inner edge of the base member 133 in the radial direction may be inserted into a fixing groove 112f formed in the circumferential direction outwardly of the sleeve 112 in the radial direction. More specifically, at least a portion of the inner edge of the base member 133 in the radial direction may be inserted into the fixing groove 112f formed in the circumferential direction outwardly of the second sleeve 112b in the radial direction. Therefore, a lower end portion of the second sleeve 112b in the axial direction may be provided with a support piece 112g protruding in the outer diameter direction so as to form the fixing groove 112f. Further, an adhesive may be applied to the fixing groove 112f, such that the second sleeve 112b and the base member 133 may be bonded to each other by the adhesive or be welded to each other. A structure in which the base member 133 and the sleeve 112, more specifically, the second sleeve 112b are coupled to each other will be described in detail with reference to FIGS. 2 to 7.

In other words, at least a portion of an inner edge of the base member 134 in a radial direction is inserted into a fixing portion 112j formed in a circumferential direction in an outer surface of the sleeve 112 in the radial direction. The fixing portion 112*j* is composed of a ridge section 112*f*, a upper support piece 112*i*, and a lower support piece 112*g*, and the ridge section 112*f* has smaller diameter than at least a part of the upper support piece 112*i* and at least a part of the lower support piece 112*g*.

The rotor hub 121, a rotating member coupled to the shaft 111 and rotating together with the shaft 111, may configure the rotor 120 simultaneously with configuring the hydrodynamic bearing assembly 110. Hereinafter, the rotor 120 will be described in detail.

The rotor 120 may be a rotating structure rotatable with respect to the stator 130 and include the rotor hub 121 having an annular ring-shaped magnet 125 disposed on an inner peripheral surface thereof, wherein the annular ring-shaped magnet 125 corresponds to a core 131 to be described below, having a predetermined interval therebetween.

In other words, the rotor hub 121 may be a rotating member coupled to the shaft 111 to rotate together with the shaft 111. Here, the shaft 111 and the rotor hub 121 may include an adhesive applied therebetween to thereby be fixed to each other. However, the shaft 111 and the rotor hub 121 are not limited to being fixed to each other in the above-mentioned method, but may be fixed to each other by various fixing methods such as a welding method, a press-fitting method, and the like.

Here, as the magnet 125, a permanent magnet generating magnetic force having a predetermined strength by alternately magnetizing an N pole and an S pole thereof in a circumferential direction may be used.

In addition, the rotor hub 121 may include a first cylindrical wall part 122 fixed to an upper end portion of the shaft 111, a disk part 123 extended from an end portion of the first cylindrical wall part 122 in the outer diameter direction, and a second cylindrical wall part 124 protruding downwardly from an edge of the disk part 123 in the outer diameter direction, wherein the second cylindrical wall part 124 may include the magnet 125 coupled to an inner peripheral surface thereof.

The rotor hub 121 may include the main wall part 126 extended in the downward axial direction so as to correspond to an outer portion of the upper portion of the sleeve 112. In more detail, the rotor hub 121 may include the main wall part 126 extended from the disk part 123 in the downward axial direction and disposed between the first and second sleeves 112*a* and 112*b*.

A liquid-vapor interface sealing the lubricating fluid may be formed between the outer portion of the first sleeve 112*a* and an inner portion of the main wall part 126. In addition, the labyrinth seal may be formed between an inner portion of the second sleeve 112*b* and an outer portion of the main wall part.

In addition, an inner surface of the main wall part 126 may be tapered, such that an interval between the inner surface of the main wall part 126 and an outer surface of the first sleeve 112*a* widens in the downward axial direction to facilitate the sealing of the lubricating fluid. Further, the outer surface of the first sleeve 112*a* may also be tapered to facilitate the sealing of the lubricating fluid.

The stator 130 may include the coil 132, the stator core 131, and the base member 133.

In other words, the stator 130 may be a fixed structure including the coil 132 generating electromagnetic force having a predetermined magnitude at the time of the application of power and a plurality of stator cores 131 having the coil 132 wound therearound.

The core 131 may be fixedly disposed on an upper portion of the base member 133 provided with a printed circuit board (not shown) having pattern circuits printed thereon, a plurality of coil holes having a predetermined size may be formed in the base member 133 corresponding to the winding coil 132 so as to penetrate through the base member 133 in order to expose the winding coil 132 downwardly, and the winding coil 132 may be electrically connected to the printed circuit board (not shown) so that external power may be supplied thereto.

The core 131 having the coil 132 wound therearound may be fixedly coupled to the outer surface of the second sleeve 112*b*. In this case, an upper end of the second sleeve 112*b* may be provided with a core seating part 112*c* protruding outwardly to allow the core 131 to be caught at an upper portion thereof, thereby guiding a fixed position of the core.

Further, the core 131 may be inserted into and fixed to the outer surface of the second sleeve 112*b* after a bond is applied to the outer surface of the second sleeve 112*b*. In addition, a bond is applied to a lower surface of the core seating part 112*c* in the axial direction, such that the lower surface of the core seating part 112*c* in the axial direction and an upper surface of the core 131 in the axial direction may be bonded to each other. However, the core 131 is not limited to being fixed by the above-mentioned fixing method, but may be fixed by various fixing methods such as a sliding method, a press-fitting method, a welding method, and the like.

The base member 133 may be manufactured by performing plastic working on a steel sheet. More specifically, the base member 133 may be manufactured by a press method, a stamping method, a deep drawing method, or the like. However, the base member 133 is not limited to being manufactured by the above-mentioned method, but may be manufactured by various methods that are not described in the present specification.

At least a portion of the inner edge of the base member 133 in the radial direction may be inserted into the fixing groove 112*f* formed in the circumferential direction outwardly of the sleeve 112 in the radial direction. More specifically, at least a portion of the inner edge of the base member 133 in the radial direction may be inserted into the fixing groove 112*f* formed in the circumferential direction outwardly of the second sleeve 112*b* in the radial direction. Therefore, the lower end portion of the second sleeve 112*b* in the axial direction may be provided with the support piece 112*g* protruding in the outer diameter direction so as to form the fixing groove 112*f*. Further, the adhesive may be applied to the fixing groove 112*f*, such that the second sleeve 112*b* and the base member 133 may be bonded to each other by the adhesive or welded to each other. A structure in which the base member 133 and the sleeve 112, more specifically, the second sleeve 112*b*, are coupled to each other will be described in detail with reference to FIGS. 2 to 7.

In addition, as shown in FIG. 1, the lower surface of the base member 133 may be positioned at the position lower than those of the lower surfaces of the sleeve 112: 112*a* and 112*b* and the cover member 116. With the above-mentioned structure, a contact between the lower surfaces of the sleeve 112: 112*a* and 112*b* and the cover member 116 and other members may be significantly decreased, and the base member 133 may substantially serve to support the sleeve 112: 112*a* and 112*b* and the cover member 116.

Figure 2:
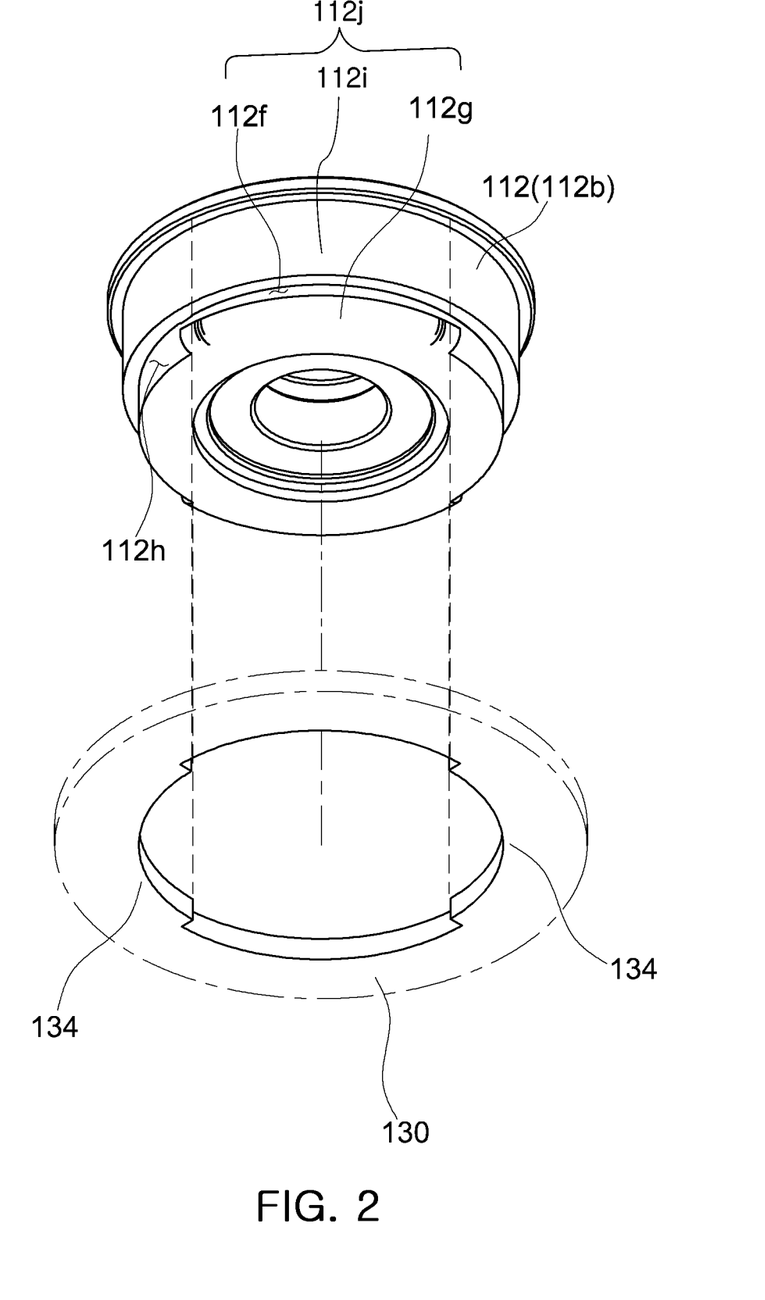
FIG. 2 is a bottom exploded perspective view showing an example in which a base member and a sleeve are coupled to each other in the spindle motor according to the embodiment of the present invention.
Figure 3:
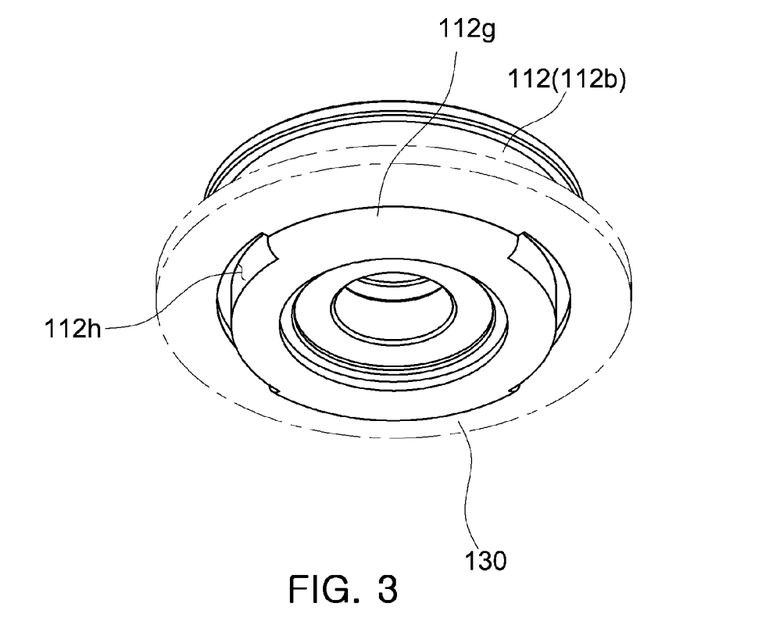
FIG. 3 is a bottom perspective view showing a shape when the base member and the sleeve of FIG. 2 are coupled to each other.
Figure 4:
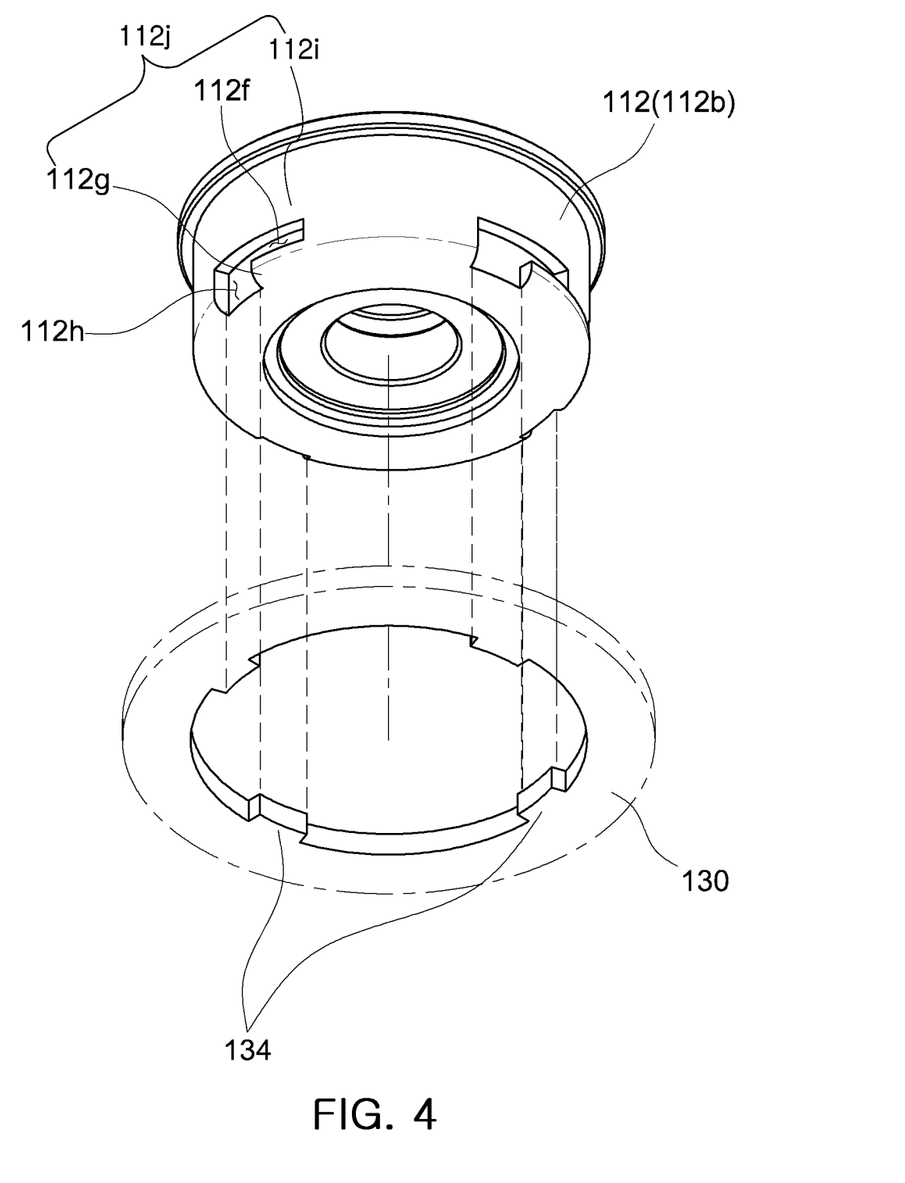
FIG. 4 is a bottom exploded perspective view showing another example in which a base member and a sleeve are coupled to each other in the spindle motor according to the embodiment of the present invention.
Figure 5:
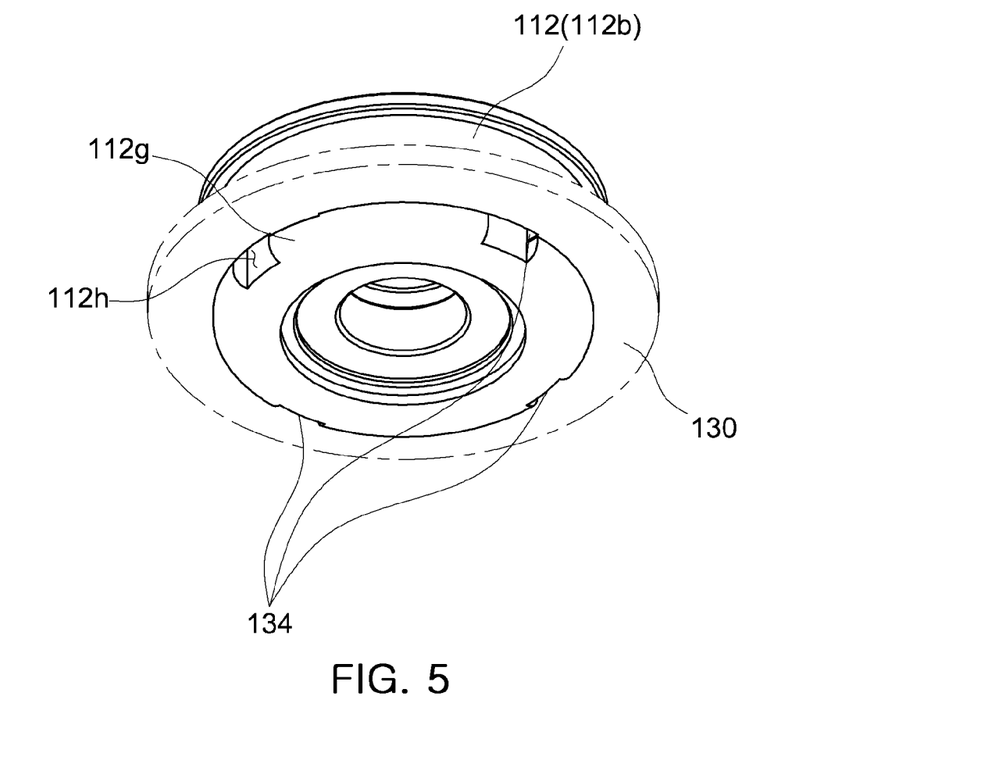
FIG. 5 is a bottom perspective view showing a shape when the base member and the sleeve of FIG. 4 are coupled to each other.
Figure 6:
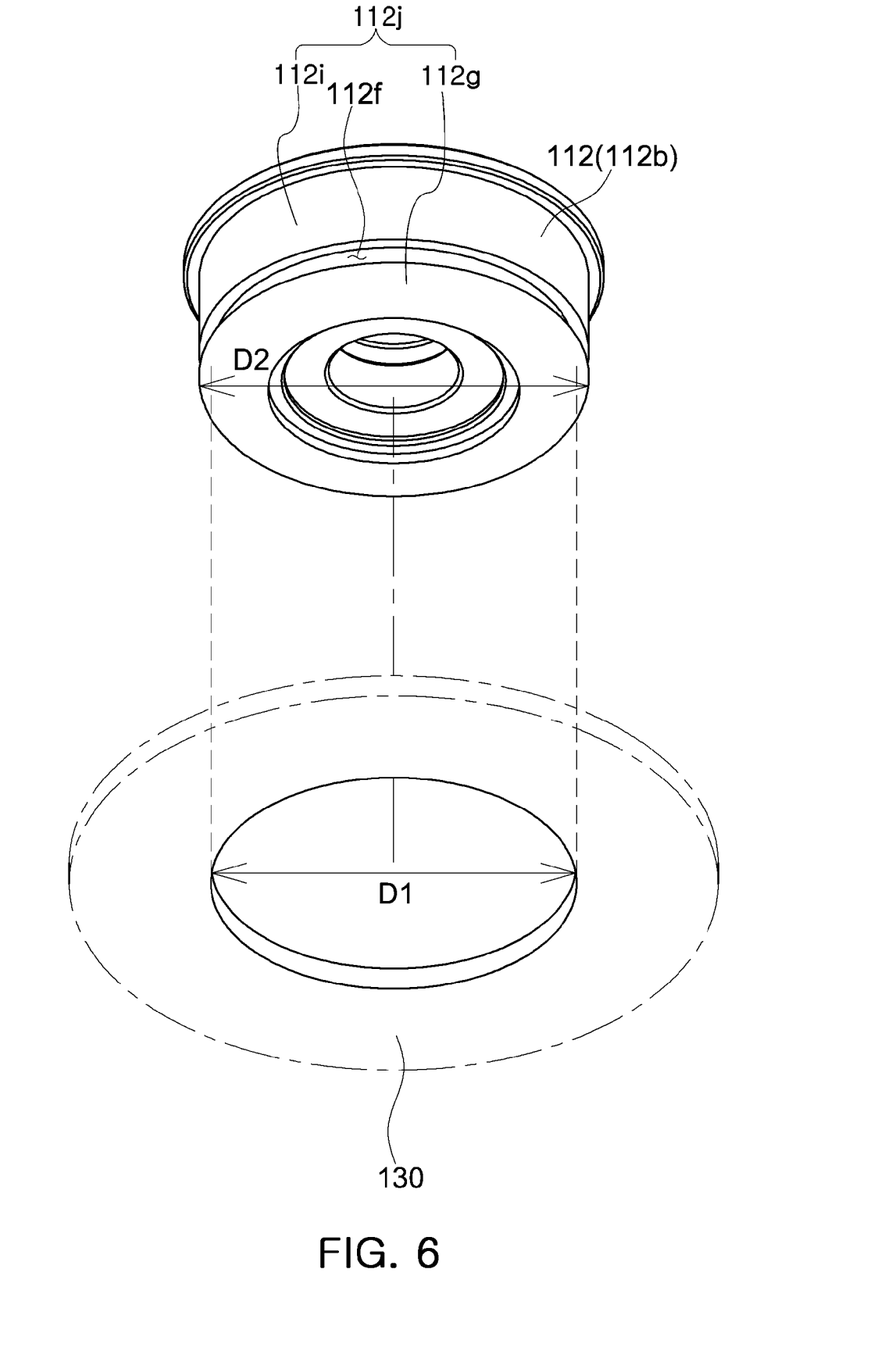
FIG. 6 is a bottom exploded perspective view showing another example in which a base member and a sleeve are coupled to each other in the spindle motor according to the embodiment of the present invention.
Figure 7:
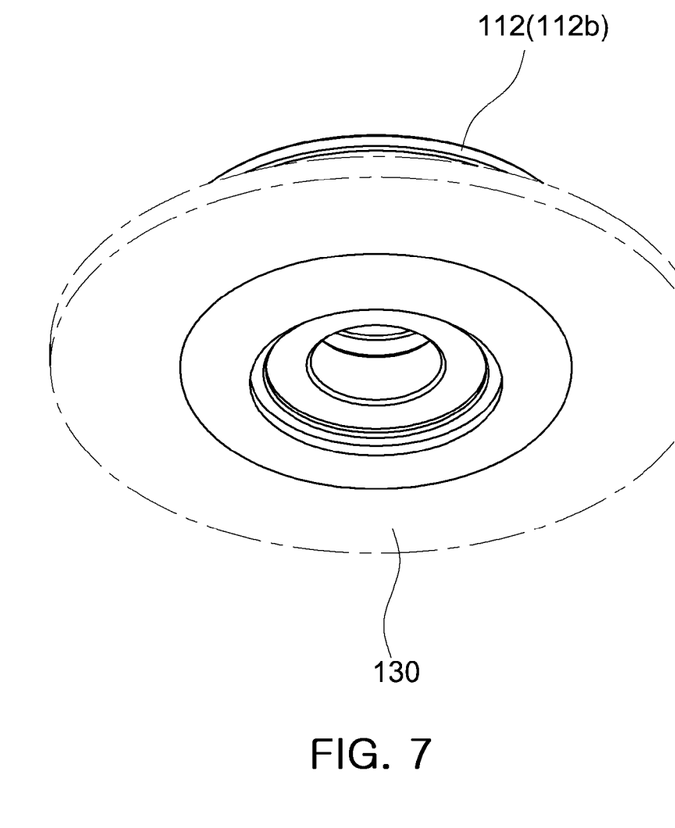
FIG. 7 is a bottom perspective view showing a shape when the base member and the sleeve of FIG. 6 are coupled to each other.

FIG. 2 is a bottom exploded perspective view showing an example in which a base member and a sleeve are coupled to each other in the spindle motor according to the embodiment of the present invention; FIG. 3 is a bottom perspective view showing a shape when the base member and the sleeve of FIG. 2 are coupled to each other; FIG. 4 is a bottom exploded perspective view showing another example in which a base member and a sleeve are coupled to each other in the spindle motor according to the embodiment of the present invention; FIG. 5 is a bottom perspective view showing a shape when the base member and the sleeve of FIG. 4 are coupled to each other; FIG. 6 is a bottom exploded perspective view showing another example in which a base member and a sleeve are coupled to each other in the spindle motor according to the embodiment of the present invention; and FIG. 7 is a bottom perspective view showing a shape when the base member and the sleeve of FIG. 6 are coupled to each other.

First, referring to FIGS. 2 and 3, a shape in which at least a portion of the inner edge of the base member 133 in the radial direction is inserted into the fixing groove 112f formed in the circumferential direction at the outer side of the sleeve 112, more specifically, the second sleeve 112b, in the radial direction, is shown.

The base member 133 may be provided with at least two fitting protrusions 134 protruding in the inner diameter direction and formed in the circumferential direction. In addition, the lower end portion of the second sleeve 112b in the axial direction may be provided with the support pieces 112g protruding in the outer diameter direction so as to form the fixing groove 112f. The fitting protrusions 134 may be inserted into the fixing groove 112f through at least two fitting grooves 112h formed in the circumferential direction so as to be in communication with the fixing groove 112f in the axial direction and then rotated in the circumferential direction to thereby be fixed so as to be overlapped with the support pieces 112g in the axial direction. Here, the number of fitting protrusions 134 may correspond to that of fitting grooves 112h. Although the case in which the numbers of fitting grooves 112h and fitting protrusions 134 are two, respectively, has been shown in FIGS. 2 and 3, the present invention is not limited thereto. That is, the numbers of fitting protrusions 134 and fitting grooves 112h may also be three or more, respectively.

In addition, the fixing groove 112f may be continuously formed in the circumferential direction. In addition, the fitting groove 112h may be formed at a portion of the support piece 112g so as to be opened in the downward axial direction. Here, the fitting protrusion 134 has an inner diameter smaller than an outer diameter of the support piece 112g, such that the fitting protrusion 134 may be firmly caught by the support piece 112g in a portion at which the fitting protrusion 134 is overlapped with the support piece 112g in the axial direction.

Next, referring to FIGS. 4 and 5, a form in which at least a portion of the inner edge of the base member 133 in the radial direction is inserted into the fixing groove 112f formed in the circumferential direction at the outer side of the sleeve 112, more specifically, the second sleeve 112b, in the radial direction, is shown.

The base member 133 may be provided with at least two fitting protrusions 134 protruding in the inner diameter direction and formed in the circumferential direction. In addition, the lower end portion of the second sleeve 112b in the axial direction may be provided with the support pieces 112g protruding in the outer diameter direction so as to form the fixing groove 112f. In the present embodiment, at least two fixing grooves 112f may be provided so as to be spaced apart from each other by a predetermined interval in the circumferential direction. That is, instead of the fixing groove 112f continuously formed in the circumferential direction, at least two fixing grooves 112f spaced apart from each other by a predetermined interval may be provided. In addition, one side of the fixing grooves 112f in the circumferential direction may be provided with at least two fitting grooves 112h so as to be in communication with the fixing grooves 112f in the axial direction. The number of fitting grooves 112h may correspond to that of fixing grooves 112f. Although the case in which the numbers of fixing grooves 112f, fitting grooves 112h, and fitting protrusions 134 are four, respectively, has been shown in FIGS. 4 and 5, the present invention is not limited thereto. That is, the numbers of fixing grooves 112f, fitting grooves 112h, and fitting protrusions 134 may be two to three or five or more, respectively.

In addition, the fitting protrusion 134 may be inserted into the fixing groove 112f through the fitting groove 112h and then rotated toward a side opposite to one side of the fixing groove 112 in the circumferential direction to thereby be fixed so as to be overlapped with the support piece 112g in the axial direction. In this case, since the fixing groove 112f has a shape in which the opposite side to one side thereof in the circumferential direction is closed, the fitting protrusion 134 may be rotated until it is caught by an end portion of the opposite side of the fixing groove 112f without separately adjusting an amount of relative rotation of the fitting protrusion 134, such that the fitting protrusion 134 and the fixing groove 112f may be simply coupled to each other.

In addition, the fitting groove 112h may be formed in one side of the support piece 112g in the circumferential direction so as to be opened in the downward axial direction. Here, the fitting protrusion 134 has an inner diameter smaller than an outer diameter of the support piece 112g, such that the fitting protrusion 134 may be firmly caught by the support piece 112g in a portion at which the fitting protrusion 134 is overlapped with the support piece 112g in the axial direction.

Next, referring to FIGS. 6 and 7, a shape in which the inner edge of the base member 133 in the radial direction is inserted into the fixing groove 112f formed in the circumferential direction at the outer side of the sleeve 112, more specifically, the second sleeve 112b, in the radial direction, is shown.

The lower end portion of the second sleeve 112b in the axial direction may be provided with the support piece 112g protruding in the outer diameter direction so as to be continuous in the circumferential direction in order to form the fixing groove 112f. In addition, a diameter D1 of an inner edge 134 of the base member 113 in the radial direction may be smaller than a diameter D2 of the support piece 112g, and the base member 113 may be press-fitted into the support piece 112g to thereby be inserted into the fixing groove 112f. The inner edge of the base member 113 in the radial direction may be press-fitted into the support piece 112g and then expanded inwardly to thereby be fixed to the fixing groove 112h so as to be overlapped with the support piece 112g in the axial direction.

Figure 8:
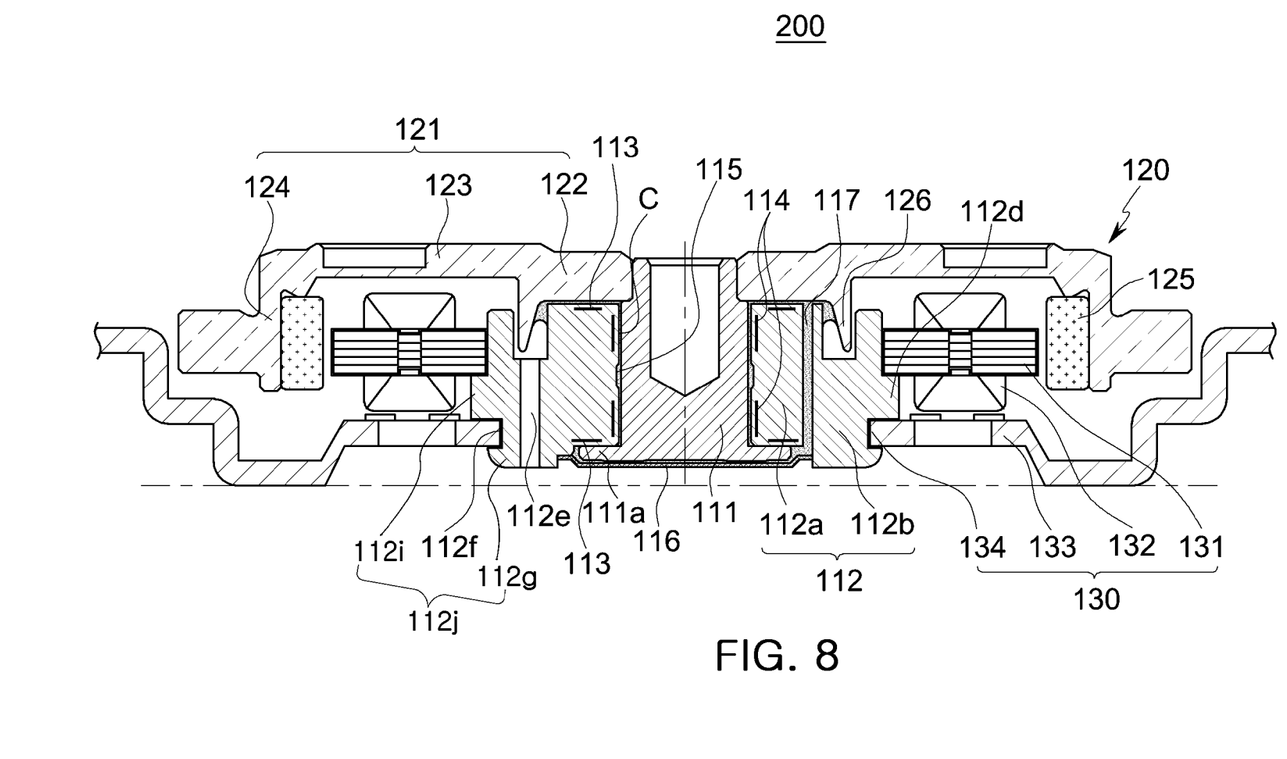
FIG. 8 is a schematic cross-sectional view showing a spindle motor according to another embodiment of the present invention.

FIG. 8 is a schematic cross-sectional view showing a spindle motor according to another embodiment of the present invention.

Referring to FIG. 8, the spindle motor 200 according to another embodiment of the present invention may be different in terms of a position of a core seating part 112d formed at a second sleeve 112b from the spindle motor 100 according to the embodiment of the present invention described with reference to FIG. 1. Therefore, a detailed description of the same structure and shape will be omitted in order to prevent confusion and make the description of the present invention clear. Hereinafter, a portion different from that of the spindle motor 100 described above with reference to FIG. 1 will be mainly described.

The core seating part 112d used in the spindle motor 200 according to another embodiment of the present invention protrudes outwardly from the second sleeve 112b to allow the stator core 131 to be caught at a lower portion thereof, such that a fixed position of the stator core 131 may be guided. That is, unlike the spindle motor 100 according to the embodiment of the present invention described with reference to FIG. 1, the core seating part 112*d* may be positioned in a position lower than that of the stator core 131 in the axial direction. The core 131 may be bonded to at least any one of an outer surface of the second sleeve 112*b* in the radial direction and an upper surface of the core seating part 112*d* in the axial direction with an adhesive.

Figure 9:
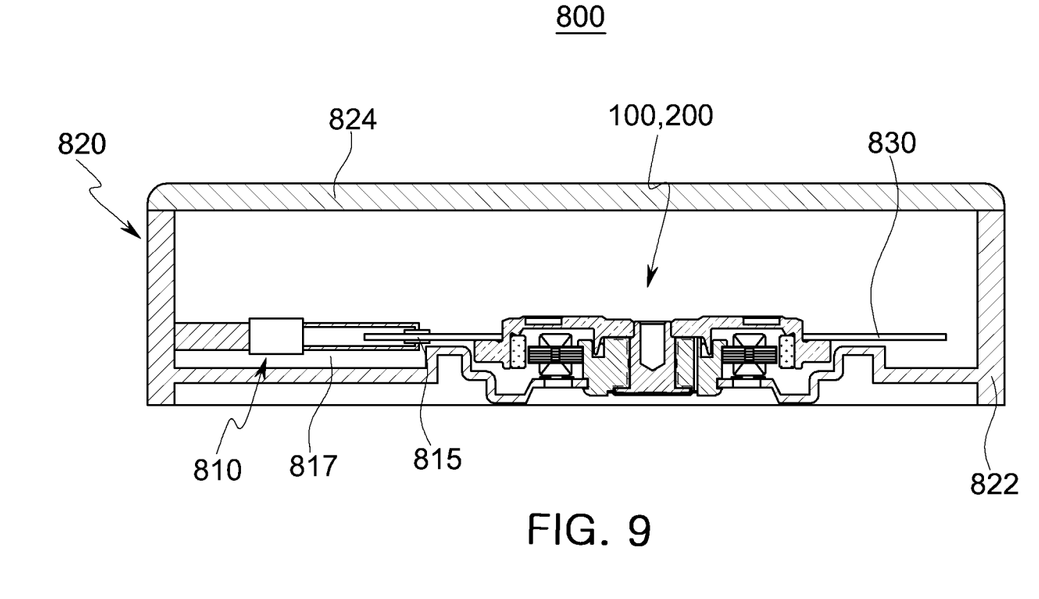
FIG. 9 is a schematic cross-sectional view of a hard disk driving device using the spindle motor according to the embodiment of the present invention.

FIG. 9 is a schematic cross-sectional view of a hard disk driving device using the spindle motor according to the embodiment of the present invention.

Referring to FIG. 9, a recording disk driving device 800 having the spindle motor 100 or 200 according to the present invention mounted therein may be a hard disk drive and include the spindle motor 100 or 200, a head transfer part 810, and a housing 820.

The spindle motor 100 or 200 may have all the characteristics of the spindle motor according to the embodiment of the present invention described above and have a recording disk 830 mounted thereon.

The head transfer part 810 may transfer a magnetic head 815 detecting information stored on the recording disk 830 mounted on the spindle motor 100 or 200 to a surface of the recording disk of which the information is to be detected.

Here, the magnetic head 815 may be disposed on a support part 817 of the head transfer part 810.

The housing 820 may include a motor mounting plate 822 and a top cover 824 shielding an upper portion of the motor mounting plate 822 in order to form an internal space receiving the spindle motor 100 or 200 and the head transfer part 810 therein.

As set forth above, according to the embodiment of the present invention, the spindle motor in which the core is stably and easily mounted on the base manufactured by plastic working such as press working, or the like, may be provided.

In addition, the spindle motor in which the base manufactured by plastic working such as pressing working, or the like, and the sleeve are easily coupled to each other may be provided.

While the present invention has been shown and described in connection with the embodiments, it will be apparent to those skilled in the art that modifications and variations can be made without departing from the spirit and scope of the invention as defined by the appended claims.

What is claimed is:

1. A spindle motor comprising:
a shaft;
a sleeve rotatably supporting the shaft by fluid dynamic pressure;
a stator core installed on an outer surface of the sleeve;
a base member fixed to the sleeve,
wherein at least a portion of an inner edge of the base member in a radial direction is inserted into a fixing portion formed in a circumferential direction in an outer surface of the sleeve in the radial direction,
the sleeve includes a first sleeve supporting the shaft and a second sleeve provided outwardly of the sleeve and having the stator core installed on an outer surface thereof,
the fixing portion is composed of a ridge section, an upper support piece, and a lower support piece,
the ridge section has smaller a diameter than at least a part of the upper support piece and at least a part of the lower support piece,
the base member is provided with at least two fitting protrusions protruding in an inner diameter direction and formed in the circumferential direction,
a lower portion of the sleeve in an axial direction is provided with lower support pieces protruding in an outer diameter direction so as to form the fixing portion, and
the fitting protrusions are inserted into the fixing portion through at least two fitting grooves formed in the circumferential direction so as to be in communication with the fixing portion in the axial direction and are then rotated in the circumferential direction to thereby be fixed so as to be overlapped with the support pieces in the axial direction.

2. The spindle motor of claim 1, the lower support piece has smaller outer diameter than outer diameter of the upper support piece.

3. The spindle motor of claim 1, wherein the fitting protrusion has an inner diameter smaller than an outer diameter of the support piece.

4. The spindle motor of claim 1, wherein a lower portion of the sleeve in an axial direction is provided with the lower support piece protruding in an outer diameter direction so as to be substantially continuous in the circumferential direction in order to form the fixing portion,
an inner edge of the base member in the radial direction has a diameter smaller than that of the support piece, and
the base member is inserted into the fixing portion.

5. The spindle motor of claim 1, wherein the fixing portion has an adhesive applied thereto, and the sleeve and the base member are bonded to each other by the adhesive.

6. The spindle motor of claim 1, wherein the sleeve and the base member are welded to each other.

7. The spindle motor of claim 1, wherein the base member is manufactured by performing plastic working on a steel sheet.

8. The spindle motor of claim 1, wherein the first and second sleeves are formed as separate members.

9. The spindle motor of claim 8, wherein the base member is fixed to the second sleeve.

10. The spindle motor of claim 8, wherein the second sleeve is provided with a core seating part protruding outwardly and the stator core is seated on the core seating part.

11. The spindle motor of claim 10, wherein an upper or lower surface of the stator core is bonded to the core seating part with an adhesive.

12. The spindle motor of claim 1, wherein the first and second sleeves are formed integrally with each other.

13. The spindle motor of claim 1, wherein the sleeve has a cover member coupled thereto at a lower end portion thereof in an axial direction, the cover member closing a shaft hole of the sleeve to preventing leakage of a lubricating fluid, and
a lower surface of the base member is positioned in a position lower than those of lower surfaces of the sleeve and the cover member.

14. A spindle motor comprising:
a shaft;
a sleeve rotatably supporting the shaft by fluid dynamic pressure;
a stator core installed on an outer surface of the sleeve;
a base member fixed to the sleeve,
wherein at least a portion of an inner edge of the base member in a radial direction is inserted into a fixing portion formed in a circumferential direction in an outer surface of the sleeve in the radial direction,
the sleeve includes a first sleeve supporting the shaft and a second sleeve provided outwardly of the sleeve and having the stator core installed on an outer surface thereof,
the fixing portion is composed of a ridge section, an upper support piece, and a lower support piece, the ridge section has smaller a diameter than at least a part of the upper support piece and at least a part of the lower support piece,
at least two fixing portions are provided so as to be spaced apart from each other by a predetermined interval in the circumferential direction,
the fitting groove is provided on one side of the fixing portion in the circumferential direction, and
the fitting protrusion is inserted into the fixing portion through the fitting groove and is then rotated toward a side opposite to one side of the fixing groove in the circumferential direction to thereby be fixed so as to be overlapped with the support piece in an axial direction.

15. A hard disk drive comprising:
a spindle motor rotating a disk by power applied thereto through a substrate;
a magnetic head writing data to and reproducing the data from the disk; and
a head transfer part moving the magnetic head to a predetermined position above the disk,
wherein the spindle motor comprises
   a shaft;
   a sleeve rotatably supporting the shaft by fluid dynamic pressure;
   a stator core installed on an outer surface of the sleeve;
   a base member fixed to the sleeve,
      wherein at least a portion of an inner edge of the base member in a radial direction is inserted into a fixing portion formed in a circumferential direction in an outer surface of the sleeve in the radial direction,
the sleeve includes a first sleeve supporting the shaft and a second sleeve provided outwardly of the sleeve and having the stator core installed on an outer surface thereof,
the fixing portion is composed of a ridge section, an upper support piece, and a lower support piece,
the ridge section has smaller a diameter than at least a part of the upper support piece and at least a part of the lower support piece,
the base member is provided with at least two fitting protrusions protruding in an inner diameter direction and formed in the circumferential direction,
a lower portion of the sleeve in an axial direction is provided with lower support pieces protruding in an outer diameter direction so as to form the fixing portion, and
the fitting protrusions are inserted into the fixing portion through at least two fitting grooves formed in the circumferential direction so as to be in communication with the fixing portion in the axial direction and are then rotated in the circumferential direction to thereby be fixed so as to be overlapped with the support pieces in the axial direction.

* * * * *